United States Patent [19]

Adelbratt

[11] Patent Number: 4,461,592
[45] Date of Patent: Jul. 24, 1984

[54] DEVICE FOR PROVIDING A FRICTION JOINT

[75] Inventor: Kurt Adelbratt, Göteborg, Sweden
[73] Assignee: Aktiebolaget SKF, Gotebort, Sweden
[21] Appl. No.: 303,427
[22] Filed: Sep. 18, 1981
[30] Foreign Application Priority Data Oct. 9, 1980 [SE] Sweden .............................. 80070618

[51] Int. Cl.³ .......................... F16B 2/02; F16D 1/00
[52] U.S. Cl. ........................................ 403/8; 403/313; 403/314; 403/374
[58] Field of Search ................. 403/303, 304, 310, 16, 403/286, 341, 8, 362, 313, 314, 309, 374, 370, 371, 366

[56] References Cited

U.S. PATENT DOCUMENTS 383,998  6/1888  Sprague et al. ................. 403/362 X
1,766,247  6/1930  Elliott ................................ 403/303
2,557,472  6/1951  Rulon .............................. 403/313 X Primary Examiner—Andrew V. Kundrat
Attorney, Agent, or Firm—Eugene E. Renz, Jr.

[57] ABSTRACT

The invention relates to a device for e.g. connecting two shafts (1,2). It comprises an inner sleeve (3) surrounding both shafts, and two outer sleeves (4,6) surrounding the inner sleeve and one shaft each. The inner sleeve is deformed radially inwards into contact with the shafts when the outer sleeves are pressed axially away from each other, whereby sliding occurs in their respective contacts with the inner sleeve. In order to provide a device which does not require access to the end surfaces (12,13) and to avoid protruding parts, pressing the sleeves (4,6) away from each other is made by screws (9) arranged in axially directed threaded bores (8) in the end surface of one of the sleeves (6) and contacting the end surface of the other sleeve (4). The screw heads (10) are accessible from radially outside.

2 Claims, 1 Drawing Figure

U.S. Patent    Jul. 24, 1984    4,461,592
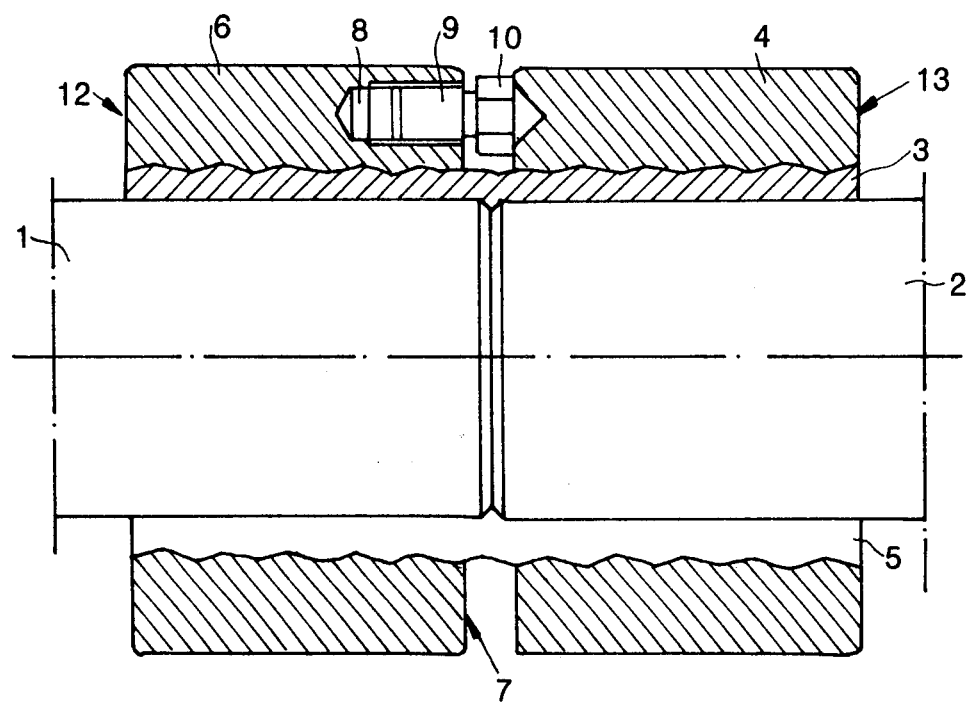

DEVICE FOR PROVIDING A FRICTION JOINT

FIELD OF THE INVENTION

The present invention relates to friction joints for connecting wheels, discs, or bearings to shaft members or the like and/or for connecting two shaft members.

DESCRIPTION OF THE PRIOR ART

Friction joints generally comprise a tapered clamping sleeve member which when adapted to circumscribe a tapered shaft or engage in the bore thereof, and which during axial displacement is deformed radially and pressed against the confronting tapered surface of the shaft to establish a force and torque transmitting friction joint. In order to obtain a desired force and torque transmitting capability, the coefficient of friction as well as the normal force in the friction surfaces must be sufficiently great. Therefore, it must be possible to produce a great axially directed displacement force.

It is known to use a number of screws arranged in threaded bores in a flange on one sleeve and contacting the end surface of the other sleeve with their respective end surfaces in order to accomplish the axial displacement in devices comprising an inner and an outer sleeve. Such a device has the disadvantage that the screw heads extend axially outside the flange, which may imply a security risk in rotating devices and give space problem and problem with access to the screws.

SUMMARY OF THE INVENTION

The object of the present invention is to provide a device of the kind referred to above, which has no protruding parts which can be damaged or cause damage and which device does not require a free space at one surface for mounting and dismounting. This is achieved according to the invention by a device which has the characterizing features defined in the accompanying claims.

Such a device consists of but a few parts which are easy to produce and assembly, and it requires comparatively little space.

BRIEF DESCRIPTION OF THE DRAWING

In the following the invention will be described in detail with reference to the accompanying drawing, which shows a longitudinal section of a preferable embodiment suitable for connecting two shafts 1,2.

DESCRIPTION OF THE PREFERRED EMBODIMENT

The device comprises an inner sleeve element 3 displaceably arranged in a bore in an outer sleeve element 4. The sleeve element 3 suitably has an axial slot 5 and surrounds the shafts 1,2, and the sleeve element 4 is an outer sleeve element surrounding the sleeve 3. When the sleeve elements 3 and 4 are displaced axially in relation to each other the sleeve element 3 is deformed radially inwards and pressed against the shaft 2. A member 6 is provided on the inner sleeve element 3. Annular member 6 has a surface 7 facing the outer sleeve element 4. A number of threaded bores 8 are arranged in this surface mainly parallel to the shafts 1,2 and screws 9 are arranged in these bores. The free end surfaces of the screws 9 contact the element 4. The screw heads 10 are shaped for co-operation with a suitable tool, e.g. a wrench, and situated in a space between the outer sleeve element 4 and the annular member 6. The space is open outwardly and the screws 9 are thus accessible from radially outside. The axial end surfaces 12,13 of the annular member 6 and outer sleeve member 4 respectively are completely flat, which is advantageous for security reasons and also means that the device can be used when the axial space is limited. No long bores have to be drilled along the member 6. The embodiment shown is especially suitable for connecting two shafts by the fact that the inner sleeve element 3 surrounds both shafts 1,2 and has a great elastic deformability as it is comparatively thin and also axially slotted. The outer sleeve element 4 surrounds the shaft 2, and the annular member 6 constitutes another outer sleeve surrounding the shaft 1 and co-operates with the inner sleeve element 3 in the same way as does the sleeve element 4. By this arrangement coarse tolerances of the shaft diameters can be allowed without jeopardizing the function of the joint. The inner sleeve element 3 can be thin along its whole length if its envelope surface is provided with threads, whose flanks constitute a comparatively small angle with the shafts 1,2, and the bore walls of the outer sleeve element 4 and annular member 6 are provided with corresponding threads. The device thereby can be assembled by screwing the annular member 6 to the inner sleeve element 3. When the joint is established, the screws 10 are tightened so that their heads are pressed against the outer sleeve element 4, whereby the sleeves 4 and annular member 6 are pressed away from each other and axial sliding occurs in the thread flanks on the inner sleeve element 3 and in the bores of the outer sleeve element 4 and annular member 6 so that a wedge action presses the sleeve against the shafts 1 and 2. The friction in the contact between the shafts and the inner sleeve element 3 enables the joint to transmit forces and torques from one shaft to the other via the inner sleeve element 3. Torque can also be transmitted between the outer sleeve element 4 and annular member 6 via the screws 9 if the heads engage in recesses 10a in the outer sleeve element 4, as shown in the figures. The joint can be disconnected by screwing the screws into their bores as the thread flanks in the envelope surface of the sleeve 3 have such an angle that self-locking is avoided in the contact between the inner sleeve element 3 and the outer sleeves element 4 and annular member 6, respectively.

Also other embodiment of the invention than the one described above are possible. For example, the complementary threads in the sleeves can have a shape which is not symmetric. The threads can also be substituted by one or more tapered portions. The annular member 6 may possibly be a flange which is integral with the sleeve 3. Thereby the device will be less suitable for connecting two shafts, but it can preferably be used for e.g. mounting of a disk on a shaft, especially if the outer sleeve element 4 is provided with an axial slot so that it expands radially outwards upon displacement along the sleeve 3, the outer sleeve element 4 being placed so that it is pressed against a bore wall in the surrounding disk.

The space for the screw heads between the element 4 and the member 6 can be annular, as shown in the drawing, or the screw heads can be provided in radially outwardly open recesses in the member 6 or the element 4, whereby member 6 and element 4 can be situated closer to each other.

What is claimed is:

1. A friction joint assembly comprising an elongated inner sleeve member having at least one first tapered surface, a pair of outer sleeve members mounted on said inner sleeve member having confronting inner axial end faces in closely spaced side by side relation and having bores with second tapered surfaces complementing said first tapered surfaces, one of said outer sleeves having an axially directed threaded bore in its inner axial end face, a one piece screw member engageable in said threaded bore and having a head portion engageable with the axial end face of said other outer sleeve, a recess in said axial end face of said other outer sleeve adapted to receive said screw head portion therein and configured to prevent relative rotation of said members, said screw member actuatable to effect relative axial displacement of said sleeve members to initiate a radial force thereby providing the friction joint.

2. A friction joint assembly as claimed in claim 1, wherein the envelope surface of the inner sleeve member and the bore walls of the outer sleeves are provided with complementary threads, the flanks of which constitute a comparatively small angle with the bore axis.

* * * * *